(12) United States Patent
Ardanaz et al.

(10) Patent No.: US 10,719,320 B2
(45) Date of Patent: Jul. 21, 2020

(54) POWER NOISE INJECTION TO CONTROL RATE OF CHANGE OF CURRENT

(71) Applicant: INTEL CORPORATION, Santa Clara, CA (US)

(72) Inventors: Federico Ardanaz, Hillsboro, OR (US); Roger Gramunt, Portland, OR (US); Jesus Corbal, Barcelona (ES); Dennis R. Bradford, Portland, OR (US); Jonathan M. Eastep, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 15/665,212

(22) Filed: Jul. 31, 2017

(65) Prior Publication Data
US 2019/0034203 A1 Jan. 31, 2019

(51) Int. Cl.
| | |
|---|---|
| *G06F 1/32* | (2019.01) |
| *G06F 9/30* | (2018.01) |
| *G05F 1/10* | (2006.01) |
| *G06F 1/3234* | (2019.01) |
| *G06F 9/38* | (2018.01) |
| *G06F 1/3206* | (2019.01) |
| *G06F 1/30* | (2006.01) |
| *G06F 1/26* | (2006.01) |

(52) U.S. Cl.
CPC .......... *G06F 9/30083* (2013.01); *G05F 1/10* (2013.01); *G06F 1/266* (2013.01); *G06F 1/305* (2013.01); *G06F 1/3206* (2013.01); *G06F 1/3243* (2013.01); *G06F 9/3867* (2013.01); *G06F 9/30079* (2013.01)

(58) Field of Classification Search
CPC .................................................. G06F 9/30083
See application file for complete search history.

(56) References Cited

U.S. PATENT DOCUMENTS

| | | | |
|---|---|---|---|
| 2004/0181698 A1 | 9/2004 | Williams | |
| 2005/0081073 A1* | 4/2005 | Williams | ............ G06F 9/30076 713/320 |
| 2007/0225959 A1 | 9/2007 | Grochowski et al. | |
| 2012/0254595 A1* | 10/2012 | Wu | ........................ G06F 1/3203 712/208 |
| 2016/0132331 A1* | 5/2016 | Godard | ................. G06F 9/3806 711/137 |
| 2017/0300329 A1* | 10/2017 | Noguchi | ................... G06F 9/38 |

OTHER PUBLICATIONS

International Preliminary Report on Patentability dated Feb. 13, 2020 for PCT Patent Application No. PCT/US2018/040135.
International Search Report & Written Opinion dated Nov. 30, 2018 for PCT Patent Application No. PCT/US2018/040135.

* cited by examiner

*Primary Examiner* — Mohammed H Rehman
(74) *Attorney, Agent, or Firm* — Green, Howard & Mughal LLP

(57) ABSTRACT

An apparatus is provided which comprises: a component; a voltage generator to supply load current to the component; first one or more circuitries to predict that the load current is to increase from a first time; and second one or more circuitries to, in anticipation of the increase in the load current from the first time, cause the component to execute first instructions during a time period that occurs prior to the first time.

20 Claims, 9 Drawing Sheets

POWER NOISE INJECTION TO CONTROL RATE OF CHANGE OF CURRENT

BACKGROUND

Voltage regulators (VRs) may continuously track a target output voltage, and may correct for observed deviations. However, when exposed to sudden consumption spikes (e.g., sudden change in the output current of a VR), the tracking mechanisms of the VR may not be fast enough to substantially correct voltage deviations.

For example, a change in an output current of a VR may be referred to as a di/dt, where di may refer to a change in the output current, and dt may refer to the elapsed time during such an event. For sudden changes in the output current (e.g., a high di/dt event), there may be overshoots and/or undershoots in the output voltage of the VR. The severity of such voltage deviations may depend on multiple factors, e.g., power dynamic range of the load, the di/dt characteristic, etc.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
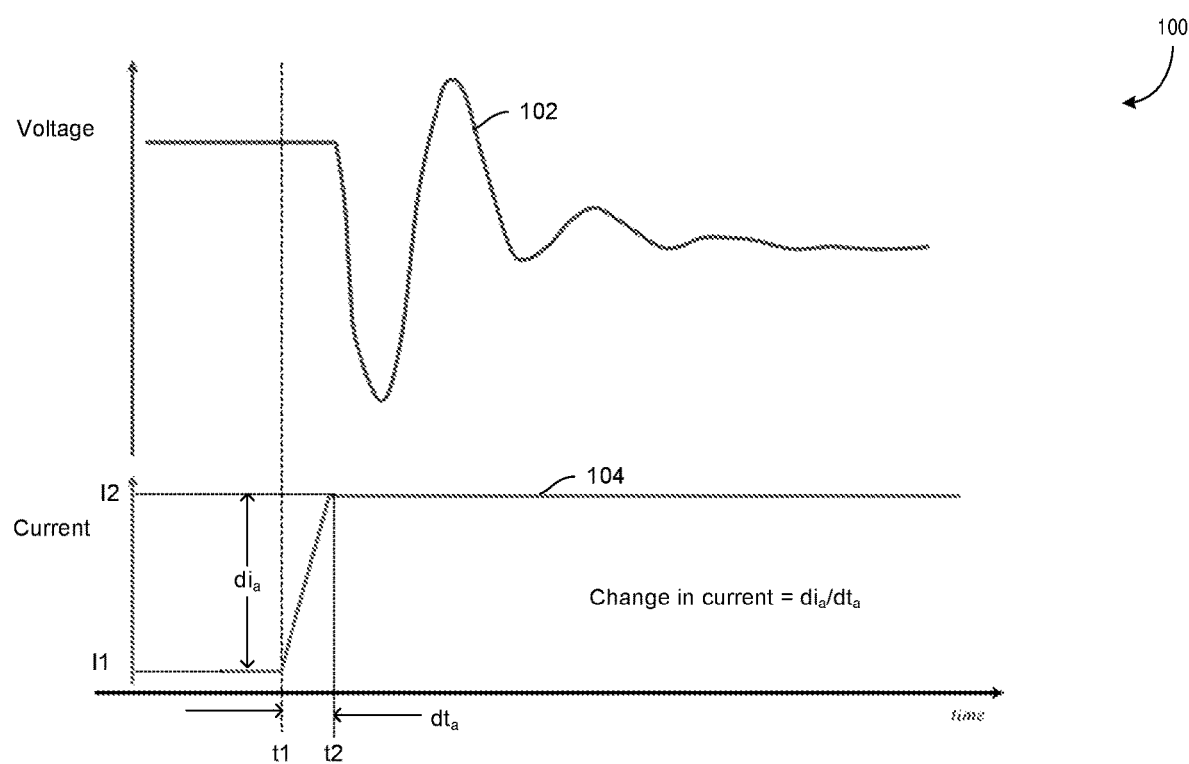
FIG. 1 illustrates a graph depicting effects of sudden change in load current of a VR.

FIG. 1 illustrates a graph 100 depicting effects of sudden change in load current of a VR. A top section of the graph 100 depicts a line 102 illustrating variation of an output voltage of the VR with time, and a bottom section of the graph 100 depicts a line 104 illustrating variation of the load current of the VR with time. For example, from time t1 to time t2, the load current increases by an amount $di_a$ (e.g., increases from I1 to I2), where the time period between time t1 and time t2 is also referred to as $dt_a$. Thus, the rate of change of current may be $di_a/dt_a$ between the time t1 and t2. The rate of change of current $di_a/dt_a$ may be relatively high, which may result in substantial undershoots and overshoots in the output voltage (e.g., as illustrated by the line 102), before the output voltage settles down to a steady state value. Such substantial undershoots and overshoots in the output voltage may be undesirable.

In FIG. 1, the load current starts increasing from time t1. Accordingly, time t1 may be referred to as a "start of event time," "a loading event time," "a start of load time," etc., e.g., a time when the load of the VR starts increasing suddenly within a short time span.

Figure 2:
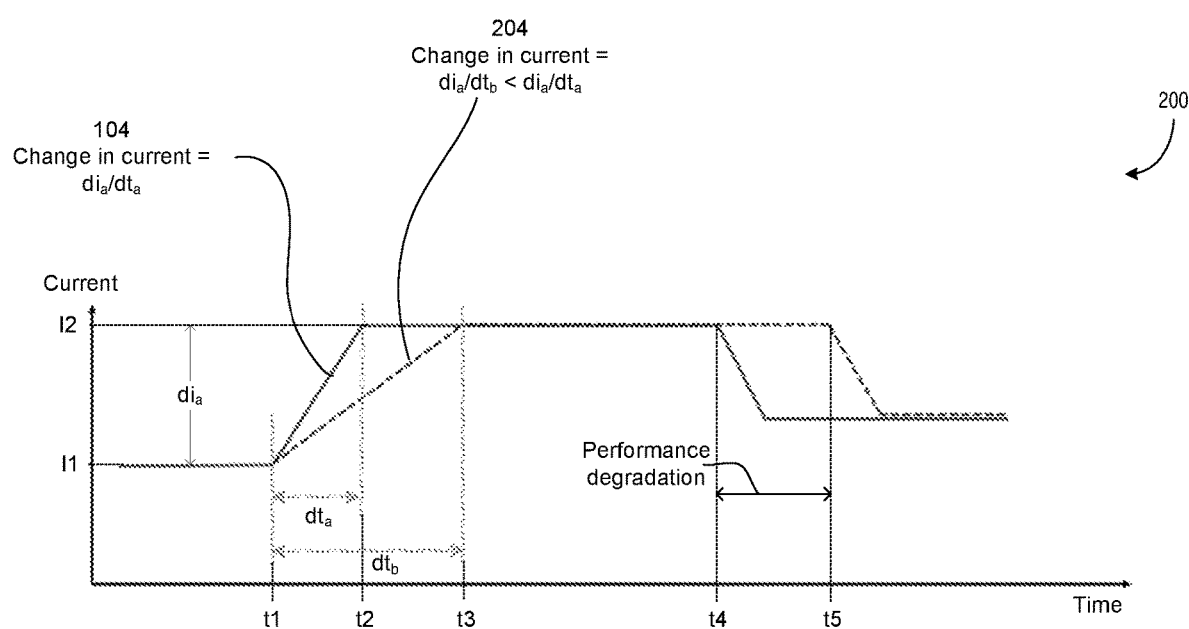
FIG. 2 illustrates a graph depicting efforts to reduce di/dt in a VR.

Efforts may be undertaken to reduce such overshoot and undershoot in the output voltage of a VR. FIG. 2 illustrates a graph 200 depicting efforts to reduce di/dt in a VR. The graph 200 illustrates variation of the load current of the VR with time. The graph 200 illustrates two lines 104 and 204, corresponding respectively to two example scenarios for operating the VR.

In the graph 200, the line 104 is similar to the line 104 of FIG. 1. For example, for the line 104, from time t1 to time t2, the load current increases by an amount $di_a$ (e.g., increases from I1 to I2), where the time period between time t1 and time t2 is also referred to as $dt_a$, and the rate of change of load current may be $di_a/dt_a$ between the time t1 and t2.

In order to reduce the rate of change of the load current, the load current may be increased gradually or at a slower rate, e.g., as illustrated by the line 204. For example, instead of increasing the load current from I1 to I2 in the short time span of time t1 to time t2, for the line 204 the load current is increased in the relatively long time span of time t1 to time t3 (e.g., increased gradually). A duration between time t1 and time t3 may be $dt_b$. Thus, the rate of change in the load current for the line 204 may be $di_a/dt_b$. Also, as illustrated, $di_a/dt_b$ may be lower than $di_a/dt_a$. Thus, for the loading scenario associated with the line 204, the overshoot/undershoot in the output voltage may be relatively less (although the output voltage graph corresponding to the line 204 is not illustrated).

However, because of relatively slow increase in the load current for the line 204, the load may take relatively more time to complete the assigned workload. For example, if a workload for the line 104 is completed by time t4, the same workload may be completed for the line 204 by time t5, where time t5 may occur after time t4. Thus, due to the relatively slow or gradual increase in the load current for the line 204, a performance penalty may be paid by having the workload being completed relatively late, and time difference between time t5 and time t4 may represent an associated degradation of performance.

In some embodiments, a system may predict a start of a loading event, e.g., predict an imminent increase of load current from, for example, time t1. Based on such prediction, the system may artificially increase the load current prior to the time t1. For example, the load may execute dummy instructions prior to the time t1, thereby gradually increasing the load current. When the load starts executing the real or actual instructions from time t1, the rate of change in the load current may not be high (e.g., as the load current was already at a moderate level at time t1 due to the execution of the dummy instructions). As the rate of change in the load current may not be high from time t1, the voltage overshoots/undershoots discussed with respect to FIG. 1 may be prevented or at least reduced. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "bottom," "over," "under," and the like in the description and in the claims, if any, are used for descriptive purposes and not necessarily for describing permanent relative positions.

Figure 3A:
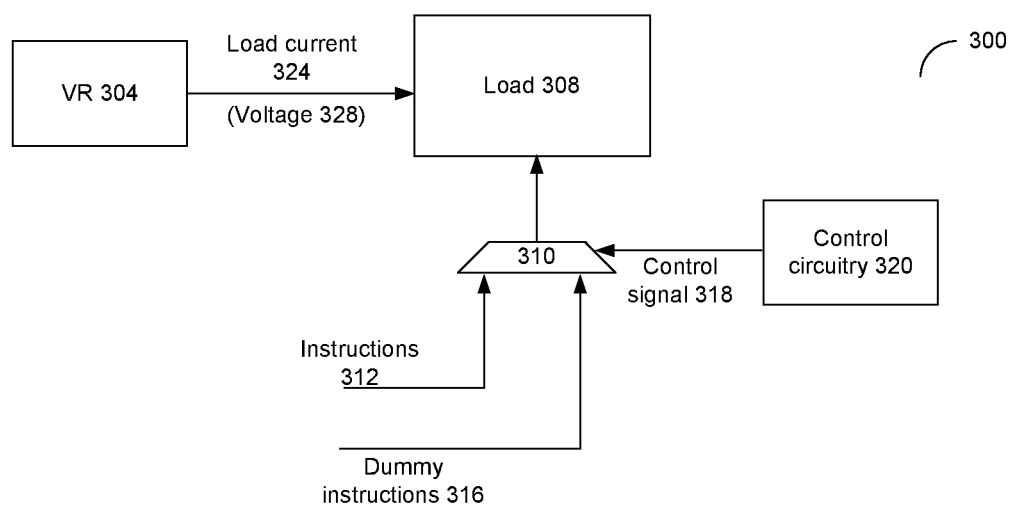
FIG. 3A schematically illustrates a system comprising a VR supplying load current to a load, wherein power noise (e.g., comprising dummy instructions) is opportunistically injected in the load ahead of a loading event to control a rate of change of the load current, according to some embodiments.
Figure 3B:
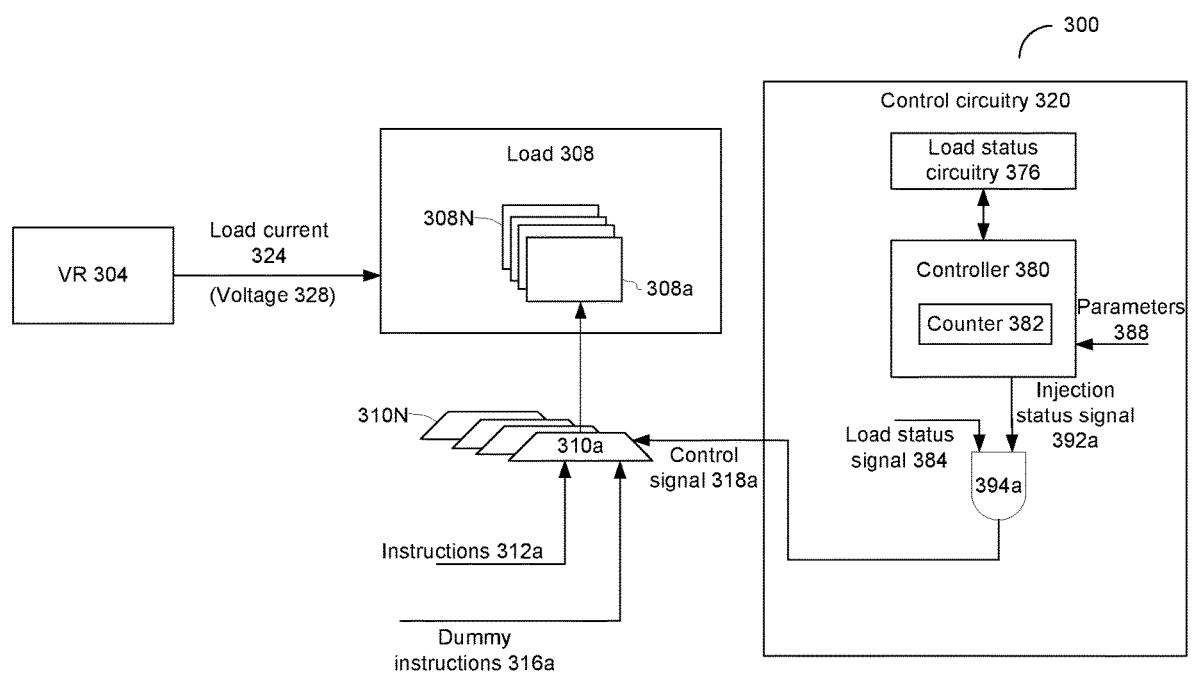
FIG. 3B illustrates an example implementation of various components of the system of FIG. 3A, according to some embodiments.

FIG. 3A schematically illustrates a system 300 comprising a VR 304 supplying load current 324 to a load 308, wherein power noise (e.g., comprising dummy instructions 316) is opportunistically injected in the load 308 ahead of a loading event to control a rate of change of the load current 324, according to some embodiments. FIG. 3B illustrates an example implementation of various components of the system 300 of FIG. 3A, according to some embodiments.

Referring to FIGS. 3A-3B, in some embodiments, the system 300 may be implemented in any appropriate computing device that comprises a VR supplying load current to one or more components. In some embodiments, the load 308 may be any appropriate type of load, e.g., a processing core, a memory, a cache, a component comprising multiple arithmetic logical units (ALUs), a central processing unit (CPU) (e.g., a CPU comprising multiple ALUs), a processor (e.g., a processor comprising multiple ALUs), a graphics processing unit (GPU) (e.g., a GPU comprising multiple ALUs), a processing core (e.g., a processing core comprising multiple ALUs), etc. Merely as an example, FIG. 3B illustrates the load 308 to comprise a plurality of ALUs 308a, . . . , 308N, although in other examples, the load 308 may comprise other appropriate components as well.

In some embodiments, the load 308 may be configured to receive instructions 312, and may operate based on the instructions 312. As the load 308 is to operate based on the instructions 312 and to differentiate the instructions 312 from the dummy instructions 316, the instructions 312 may also be referred to as real instructions, load instructions, instructions associated with workload assigned to the load 308, instructions within an instruction pipeline associated with the load 308, and/or the like. Merely as an example, if the load 308 comprises a plurality of ALUs, the ALUs of the load 308 may execute the instructions 312. In some embodiments, the instructions 312 may be received from any appropriate component that may generate such instructions for the load 308.

In some embodiments, the dummy instructions 316 may be instructions that may be executed by the load 308, e.g., merely to keep the load current 324 artificially high, and may not contribute to an actual workload of the load 308. For example, the dummy instructions 316 may be mere power noise injected to keep the load 308 artificially busy. The dummy instructions 316 may also be referred to as fake instructions, false instructions, power noise, artificial instructions, non-workload related instructions, instructions not producing any useful or meaningful result, and/or the like.

In some embodiments, the instructions 312 and 316 may be selectively received via a multiplexer 310. For example, the multiplexer 310 may receive the instructions 312 and dummy instructions 316, and may selectively output, at any given time, one of the instructions 312 and dummy instructions 316 to the load 308. The output of the multiplexer 310 may be based on a control signal 318. In some embodiments, a control circuitry 320 may generate the control signal 318.

In some embodiments, the control circuitry 320 may predict when the load current 324 is to increase sharply and suddenly. The control circuitry 320 may, for example, predict that the load current 324 is to increase sharply from time t1. In some embodiments, in anticipation of an imminent sharp and sudden increase in the load current 324, the control circuitry 320 may artificially increase the load current 324 from prior to time t1, e.g., such that the increase in the load current 324 (e.g., the rate of change of the load current 324) is gradual from time t1, thereby avoiding the high voltage transient discussed with respect to FIG. 1.

In the example implementation of FIG. 3B, there may be multiple instances of the multiplexer 310, e.g., multiplexers 310a, . . . , 310N. The multiplexers 310a, . . . , 310N may correspondingly supply instructions to the ALUs 308a, . . . , 308N, respectively, of the load 308. For example, the multiplexer 310a may receive instructions 312a and dummy instructions 316a, and may output to the ALU 308a, e.g., based on the status of a control signal 318a. In another example, the multiplexer 310N may receive instructions 312N and dummy instructions 316N (not illustrated in FIG. 3B), and may output to the ALU 308N, e.g., based on the status of a control signal 318N (not illustrated in FIG. 3B).

In some embodiments, the load 308 may receive the load current 324 from the VR 304. The VR 304 may be any appropriate type of voltage regulator, or voltage generator. The load current 324 may be supplied with an output voltage level 328.

In the example implementation of FIG. 3B, the control circuitry 320 may comprise a controller 380. The controller 380 may communicate with a load status circuitry 376. In some embodiments, the load status circuitry 376 may provide updates on a status of the load 308, and/or may predict a future status of the load 308, as discussed herein later in further details. For example, the load status circuitry 376 may provide, in real time, a current operational phase of the load 308, may predict an imminent and sudden increase in the load current 324, may predict whether an instruction pipeline associated with the load 308 stores high power instructions, may predict when the load 308 may come out of a stall condition, and/or the like, as discussed herein later in further details.

In some embodiments, the controller 380 may be a finite state machine (FSM). As the controller 380 may be responsible for injecting power noise, the controller 380 may also be referred to as a power noise FSM. In some embodiments, the controller 380 may receive one or more parameters 388, which may dictate a manner in which power noise may be selectively injected in the load 308. In some embodiments, the controller 380 may include a counter 382 (although in some other embodiments, the counter 382 may be external to the controller 380, and the controller 380 can access the external counter 382).

In some embodiments, the controller 380 may generate an injection status signal 392a, which may be received by a logical AND gate 394a. The gate 394a may also receive a load status signal 384. The gate 394a may perform an AND operation of the injection status signal 392a and the load status signal 384, and generate the control signal 318a.

Although FIG. 3B illustrates generation of the control signal 318a for controlling the multiplexer 310a, in some embodiments, control signals 318b, . . . , 318N may be similarly generated, for example, to control the multiplexers 310b, . . . , 310N, respectively. For example, the controller 380 may generate a series of injection status signals 392b, 392N, which may be respectively received by a corresponding series of AND gates 394b, 394N. Each of the AND gates 394b, 394N may also receive the load status signal 384. The AND gates 394b, 394N may perform corresponding AND-ing operations to generate the control signals 318b, . . . , 318N.

Figure 4:
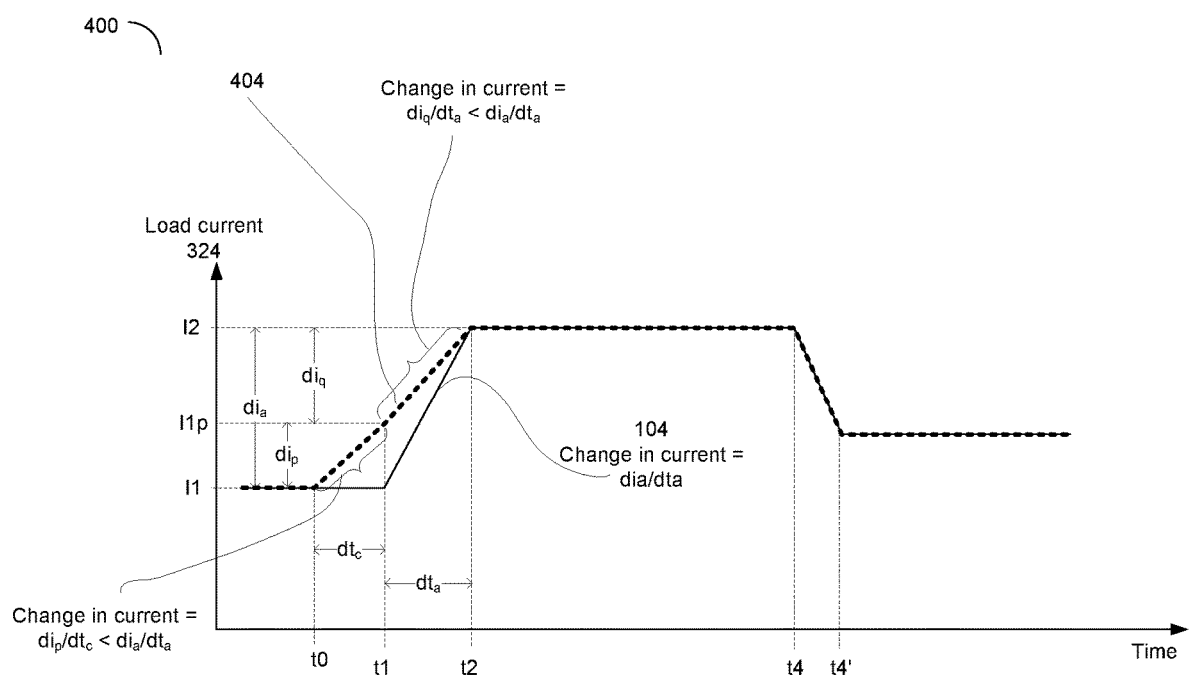
FIG. 4 illustrates a graph depicting an operation of the system of FIGS. 3A-3B, according to some embodiments.

FIG. 4 illustrates a graph 400 depicting an operation of the system 300 of FIGS. 3A-3B, according to some embodiments. The graph 400 illustrates variation of the load current 324 with time. The graph 400 illustrates two lines corresponding to two example operational scenarios of the VR 304: a line 104 (illustrated using solid line) and a line 404 (illustrated using dotted line).

The line 104 corresponds to the line with similar label of FIG. 1. The load current 324 may follow the line 104 if, for example, the control circuitry 320 and the multiplexer 310 are absent from the system 300 or are non-operational (e.g., if the load 308 is to execute the instructions 312, but never execute the dummy instructions 316). In an example, the line 104 may correspond to a conventional system having a VR and a corresponding load.

The dotted line 404 corresponds to the situation where the control circuitry 320 is operational and the load 308 is being selectively exposed to the dummy instructions 316, according to some embodiments. For example, assume that from time t1, the load 308 may be expected to start acting on the instructions 312. For example, the time t1 may indicate a start of a loading event, when the load 308 (e.g., one or more of the ALUs 308a, . . . , 308N) may start executing the instructions 312.

For example, prior to time t1, the load 308 may be in a stall condition. The load 308 may stall (e.g., prior to time t1) for a variety of reasons. For example, if one or more operands are unavailable (e.g., generally because the operands are being fetched from a memory), the load 308 may stall until the operands are available. Put differently, if the load 308 needs access to data/instructions/operands to execute the instructions 312 and these are not immediately available to the load 308, the load 308 may fetch these from a memory, a cache, or the like. While these are being fetched, the load 308 may stall, e.g., not able to execute further instructions. Once the data/instructions/operands are available, the load 308 may continue executing the instructions 312.

For example, a stall condition may be followed by a flurry or burst of activity, which may start from time t1. Thus, time t1 may be a time when a stall condition of the load 308 ends (e.g., the load 308 receives the data/instructions/operands from the cache or the memory), and the load 308 starts executing (or continues executing) the instructions 312.

In some embodiments, if the load 308 is not supplied with the dummy instructions 316, the load 308 may bump up the load current 324 from time t1, e.g., as illustrated by the line 104. The high rate of change in load current 324, e.g., high $di_a/dt_a$, associated with the line 104 may result in undesirable overshoots and/or undershoots in the voltage 328, as discussed with respect to FIG. 1.

In some embodiments, to avoid the high rate of change in the load current 324, prior to the time t1, the load 324 may be supplied with the dummy instructions 316. For example, at or immediately prior to time t0 (where time t0 occurs prior to time t1), the control circuitry 320 may anticipate that the stall condition of the load 308 may end at time t1 and/or may anticipate an imminent sudden increase in the load current 324. For example, the load status circuitry 376 of FIG. 3B may warn the controller 380 that the load 308 (e.g., one or more of the ALUs 308a, . . . , 308N) is in a stall condition, and the stall condition may end soon (e.g., from time t1). Thus, the load status circuitry 376 may predict an end of a stall condition, a start of a sudden increase in the load current 324, and/or the like.

In some embodiments, the load status circuitry 376 may receive information about the ending of the stall condition, for example, by monitoring an instruction pipeline associated with the load 308. In some other embodiments, the load 308 may provide indications to the load status circuitry 376 on, for example, when the stall condition may end.

In some embodiments, the load status circuitry 376 may be based on instruction-type detection at a decode phase in the pipeline associated with the load 308. The pipeline (not illustrated in the figures) may store instructions for execution by the load 308, and may also be referred to as an instruction pipeline. For example, the design may be applicable when specific types of instructions may be responsible for the worst-case power consumption scenario (e.g., sudden and sharp increase in the load current 324), and when such a scenario may be effectively identified in the decode pipeline stage of the load 308.

In some embodiments, the controller 380 may also receive parameters 388. In some embodiments, the parameters 388 may be used configurable parameters. The parameters 388 are discussed in further details herein later.

In some embodiments, based on the parameters 388 and/or input from the load status circuitry 376, the controller 380 may generate the injection status signal 392a. For example, the controller 380 may generate the injection status signal 392a when the load 308 is currently stalled, and is about to come out of the stall condition. In another example, the controller 380 may generate the injection status signal 392a when the load current 324 is anticipated to increase sharply and suddenly.

For example, the load 308 may come out of the stall condition from time t1. In some embodiments, the controller 380 may generate the injection status signal 392a (e.g., may toggle the injection status signal 392a to have a specific value of, for example, one) from time to. Put differently, in anticipation of an imminent and sudden loading event of the load 308 from time t1 (e.g., in anticipation of the load 308 coming out of the stall condition from time t1), the controller 380 may generate the injection status signal 392a to have a high logical value from time t0 (e.g., prior to time t0, the injection status signal 392a may have a low logical value).

In an example, the load status signal 384 may be high when the load 308 is stalled. In an example, the load status signal 384 may be high when the load 308 is not executing the instructions 312. Thus, for example, the load status signal 384 may be high prior to time t1. At time t1, the load status signal 384 may transition to a low logical value.

In some embodiments, the load status signal 384 may be generated by the load 308. In some embodiments, the load status signal 384 may be generated by an appropriate component (e.g., the circuitry 376, the controller 380, a load monitoring circuitry not illustrated in FIG. 3B, or another appropriate component), e.g., based on receiving some kind of feedback from the load 308.

Thus, prior to time t0, the load status signal 384 may be at a logical high level, and the injection status signal 392a may be at a logical low level—accordingly, prior to time t0, the control signal 318a may be at a logical low level. At time t0, the injection status signal 392a may transition to a logical high level, and the control signal 318a may become logical high. Accordingly, the multiplexer 310a may start inputting the dummy instructions 316a to the load 308 (e.g., to the ALU 308a).

At time t1, the load status signal 384 may become low, e.g., to indicate that the load 308 is out of the stalled condition and is to execute instructions. Thus, from time t1 onwards, the control signal 318a may be low and the multiplexer 310a may input the instructions 312a to the load 308 (e.g., to the ALU 308a).

Thus, from time t1 onwards, the load 308 executes the instructions 312. However, between time t0 and time t1, the load 308 may execute the dummy instructions 316 (e.g., one or more of the dummy instructions 316a, 316b, ..., 316N). Executing the dummy instructions 316 may artificially increase the load current 324, as illustrated by the dotted line 404 between time t0 and time t1. Thus, the increase of the load current 324 from time t0 to time t1, as illustrated by the dotted line 404, may be due to the load 308 executing the dummy instructions 316. For example, the load current 324 increases from I1 to I1p between time t0 to time t1.

From time t1 onwards, the dummy instructions 316 are stopped from being executed, and the rise in current from I1p to I2, between time t1 and t2, may be due to the execution of the instructions 312.

Thus, the load current 324 may be increased in two steps: between time t0 to time t1 based on executing the dummy instructions 316, and between time t1 to time t2 based on executing the instructions 312. Because the load current 324 is increased in two steps and in a gradual manner, the rate of change of the load current 324 may be relatively low (e.g., lower than the line 104).

For example, assume the time duration between time t0 and t1 is $dt_c$. Also, assume the time duration between time t1 and t2 is $dt_a$ (e.g., as discussed with respect to FIG. 1). Assume that the difference in load current 324 between current I1 and I1p is $di_p$; and the difference in load current 324 between current I1p and I2 is $di_q$. Thus, the rate of increase in the load current 324 between time t0 and time t1 is $di_p/dt_c$, which may be lower than the rate of increase $di_a/dt_a$ in the load current of the line 104. Similarly, the rate of increase in the load current 324 between time t1 and time t2 is $di_q/dt_a$, which may also be lower than the rate of increase $di_a/dt_a$ in the load current of the line 104. Thus, injecting the power noise (e.g., via dummy instructions 316), prior to the actual loading event from time t1, may substantially decrease the rate of increase in the load current 324. Put differently, the system 300 may gradually increase the load current 324 from a stalled current value of I1 to a fully operational current value of I2. It is to be noted that although the slopes of the line 404 between time t0-t1 and between time t1-t2 may appear somewhat similar in FIG. 4, these two slopes may be different (e.g., $di_p/dt_c$ may be different from $di_q/dt_a$).

Furthermore, the load 308 is loaded from time t1 using a permissible or maximum loading gradient. Thus, the load 308 may complete the assigned workload at time t4. In contrast, in FIG. 2, the load 308 was deliberately loaded slowly from time t1, as a result of which the load 308 completed the assigned workload at time t5 (e.g., thereby leading to a performance degradation that was represented by a delayed completion of the workload at time t5). The system 300 of FIGS. 3A-3B does not suffer such degradation in performance or any delay in workload execution. For example, unlike the discussion with respect to line 204 of FIG. 2, in the system 300, the working of the load 308 may not be deliberately slowed or throttled. Rather, the decrease in the rate of change in the load current 324 may be achieved by, for example, predicting when a sharp increase in the load current 324 may take place, and artificially increasing the load current 324 prior to the predicted sharp increase in the load current 324.

There may be some increase in power consumption due to the execution of the dummy instructions from time t0 to time t1. However, such an increase in the power consumption may be negligible and inconsequential, e.g., when compared to the effect of decreasing the rate of change in the load current 324. The decrease in the rate of change in the load current 324 may decrease potential overshoot and/or undershoot of the voltage 328, thereby improving the transient voltage behavior of the output of the VR 304.

In some embodiments, an effectiveness of the system 300 may depend on the load status circuitry 376 correctly predicting an end of the stall condition of the load 308, and/or predicting a sudden and sharp increase in the load current 324. A false positive prediction (e.g., predicting an end of the stall, but such an end of stall not happening) can lead to unnecessary injection of power noise (e.g., unnecessary executing of the dummy instructions 316) and may have some power inefficiency involved—but such false positive prediction may not have much or significant negative effect on the performance of the system 300.

However, a false negative prediction (e.g., the load status circuitry 376 failing to predict a sudden and sharp increase in the load current 324) may have significant negative effect on the performance of the system 300. For example, such false negative prediction may result in considerable droop in the voltage 328 (e.g., considerable overshoot and/or undershoot), as discussed with respect to FIG. 1. For example, such transient voltage swing may reduce the voltage 328 below a minimum permissible limit, which may result in functional incorrectness or have a higher performance penalty than the slight power inefficiency resulting from the above discussed false positive prediction.

Thus, in some embodiments, the system 300 may withstand false positive predictions better than false negative predictions, and hence, in some examples, the load status circuitry 376 may be configured to provide a prediction whenever the load status circuitry 376 sees any indication of an imminent increase of the load current 324.

In some embodiments, presence of high power instructions (e.g., series of instructions that can potentially cause a sudden and sharp spike in the load current 324) in an instruction pipeline of the load 308 may be indicator of risk. For example, as long as high power instructions are present in the pipeline, it may be assumed that a sudden spike can potentially take place at any moment. Thus, if high power instructions are present in the pipeline, the load status circuitry 376 may be at a constant lookout for any stall condition of the load 308 and/or for any potential future spike in the load current 324.

Figure 5:
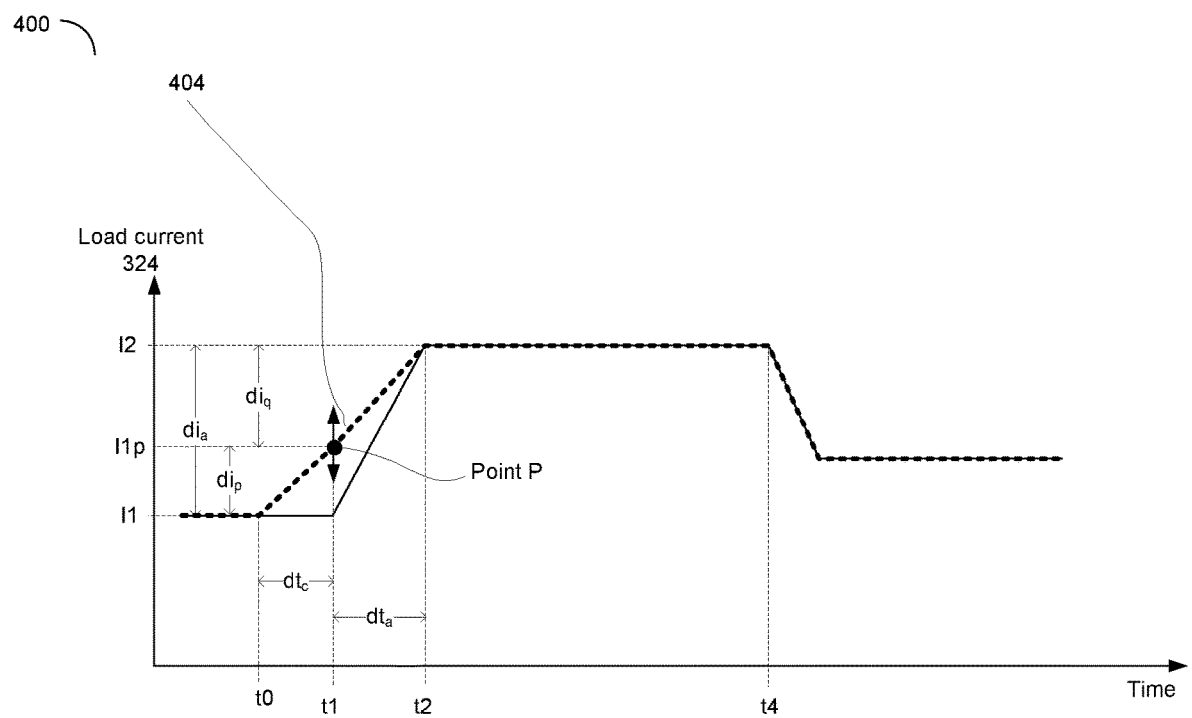
FIG. 5 illustrates the graph of FIG. 4 in more details, according to some embodiments.

FIG. 5 illustrates the graph 400 of FIG. 4 in more details, according to some embodiments. For example, the graph 400 in FIG. 5 illustrates a point P where the line 404 passes the time t1. Thus, the load current 324 at the point P is I1$p$, and the time at the point P is t1.

In some embodiments, the system 300 can be fine-tuned by shifting the point P up or down (e.g., by tuning a value of the current I1$p$). For example, if a huge amount of dummy instructions 316 are provided to the load 308 between time t0 and time t1, the point P may go up and the value of the current I1$p$ will increase. This may increase the rate of change in load current 324 between time t0 to time t1, but may decrease the rate of change in load current 324 between time t1 to time t2.

On the other hand, if relatively less amount of dummy instructions 316 are provided to the load 308 between time t0 and time t1, the point P may go down and the value of the current I1$p$ will decrease. This may decrease the rate of change in load current 324 between time t0 to time t1, but may increase the rate of change in load current 324 between time t1 to time t2.

In some embodiments, the current I1$a$ may be based on a variety of factors, e.g., an amount of dummy instructions 316 provided to the load 308, a number of ALUs 308$a$, ..., 308N that may be loaded with the dummy instructions 316, the difference between the time t0 and time t1, design of the load 308, design of the VR 304, a voltage swing tolerance capability of the load 308, etc. In some embodiments, the point P may be fine-tuned by a user of the system 300, by a manufacturer and/or the like. For example, although not illustrated in the figures, the system 300 may include firmware-visible control registers to enable microadjusting the timing (e.g., a difference between time t0 and time t1) and the dummy instructions 316 injected into the system 300.

In some embodiments, only some of the ALUs 308$a$, ..., 308N may be loaded with the dummy instructions 316 between time t0 and t1. For example, one or more (but not all) ALUs may be loaded to their respective capacity with the dummy instructions 316 between time t0 and t1. In some other examples, some of the ALUs may be partially loaded with the dummy instructions 316.

In some other embodiments, all the ALUs 308$a$, ..., 308N may be loaded with the dummy instructions 316 between time t0 and t1 (e.g., individual ALUs may only be partially loaded).

Figure 6:
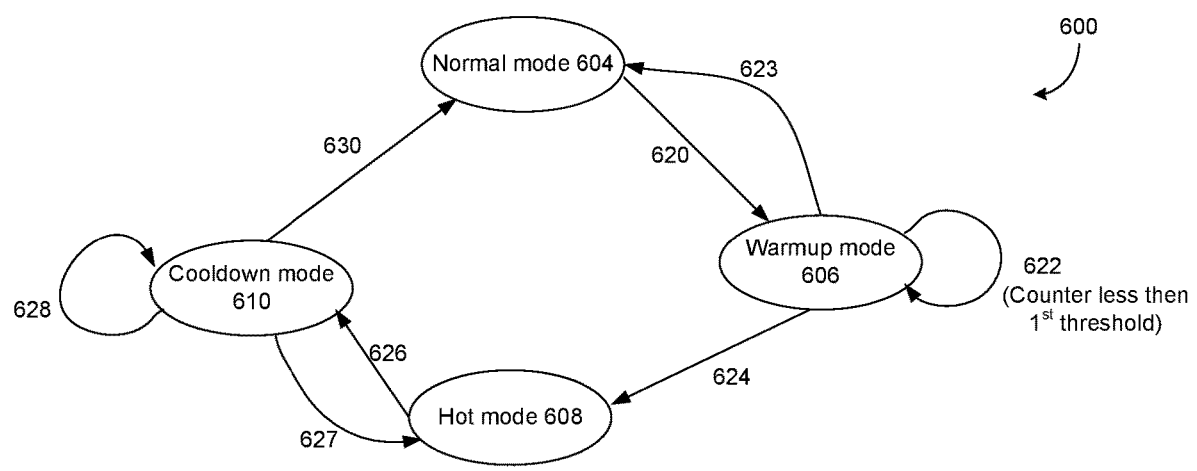
FIG. 6 illustrates a state transition diagram illustrating transition among various states of a controller of FIG. 3B, according to some embodiments.

FIG. 6 illustrates a state transition diagram 600 illustrating transition among various states of the controller 380 of FIG. 3B, according to some embodiments. Table 1 below illustrates behavior of the controller 380 for various states of the controller 380.

TABLE 1

| Parameters | Normal mode 604 | Warmup mode 606 | Hot mode 608 | Cooldown mode 610 |
|---|---|---|---|---|
| Injection status signals 392$a$, ..., 392N | 0 | Enabled | Enabled | Enabled |
| Counter 382 | 0 | Increment | 0 | Increment |

Referring again to FIG. 3B, the controller 380 may act as a finite state machine (FSM). For example, such a FSM may be used to control the injection of power noise in the load 308. In some embodiments, presence of high power instructions (e.g., instructions that can potentially cause a sudden and sharp spike in the load current 324) in a pipeline of the load 308 may be indicator of risk. For example, as long as high power instructions are present in the pipeline, it may be assumed that a sudden spike can potentially take place at any moment. Thus, if high power instructions are present in the pipeline, the load status circuitry 376 may be at a constant lookout for any stall condition of the load 308 and/or for any potential future spike in the load current 324.

Referring again to FIG. 6, a normal mode 604 may refer to a normal execution mode of the load 308 when, for example, no high-power instructions are present in the pipeline associated with the load. As discussed herein above, during the normal mode 604, the injection status signals 392$a$, ..., 392N may indicate that no power noise or dummy instructions 316 are to be injected to the load 308. For example, the injection status signals 392$a$, ..., 392N may have a low logical value, as depicted in Table 1. In some embodiments, the counter 382 may be set to zero and not incremented, as depicted in Table 1. In an example, the controller 380 may be in the normal mode 604 prior to time t0.

In some embodiments, the controller 380 may transition from the normal mode 604 to a warmup mode 606 (e.g., illustrated via transition line 620) when, for example, high power instructions are detected in the pipeline, when the load status circuitry 376 predicts an imminent potential and sudden spike in the load current 324, when the load status circuitry 376 predicts an imminent end of a stalled condition followed by high load condition, and/or the like. Once in the warmup mode, the injection status signals 392$a$, ..., 392N may have a high logical value, as depicted in Table 1. Thus, the load 308 may be injected with dummy instructions 316. In some embodiments, the counter 382 may be incremented, as depicted in Table 1, e.g., to keep track of a time or a number of clock cycles (e.g., a minimum amount of a time or a minimum number of clock cycles) that the controller 380 is in the warmup mode 606. Thus, the controller 380 may be in the warmup mode 606 for at least a minimum amount of time (e.g., depicted using the line 622). For example, the counter 382 may be incremented every clock cycle the controller 380 is in the warmup mode 606, and the controller 380 may remain in the warmup mode 606 until at least the counter 382 reaches a threshold value. This is symbolically illustrated in FIG. 6 as the controller 380 remaining in the warmup mode 606 at least as long as "Counter less than 1$^{st}$ threshold." In some embodiments, the warmup mode 606 may correspond to the period between time t0 and time t1 in FIG. 4.

In some embodiments, the controller 380 may return from the warmup mode 606 to the normal mode 604 (e.g., illustrated by line 623), e.g., if the predicted spike in the load current 324 does not occur. For example, after the counter 382 reaching the first threshold value and the predicted spike in the load current 324 not occurring, the controller 380 may return from the warmup mode 606 to the normal mode 604.

In some embodiments, the controller 380 may transition from the warmup mode 606 to a hot mode 608 (e.g., illustrated by line 624), e.g., based on the load 308 starting to execute the instructions 312, and/or the like. The hot mode 608 may correspond to the time period between time t2 and t4 in FIG. 4.

In some embodiments and as depicted in Table 1, while in the hot mode 608, the controller 380 may not increment the counter 382. Also, in some embodiments, the controller 380 may continue to keep the injection status signals 392a, ..., 392N enabled while in the hot mode 608 (although in some other embodiments, the controller 380 may disable the injection status signals 392a, ..., 392N).

In some embodiments, the controller 380 may transition from the hot mode 608 to a cooldown mode 610 (e.g., illustrated via line 626), e.g., after the load 308 completes execution of assigned instructions 312, after the load 308 encounters another stall condition, and/or the like. A difference between the cooldown mode 610 and the normal mode 604 may be that in the cooldown mode 610, high power instructions may still remain in the pipeline and there may be possibility of an imminent sudden spike while in the cooldown mode 610. In contrast, in the normal mode 604, high power instructions may not be in the pipeline and/or there may not be possibility of any imminent sudden spike.

Figure 7:
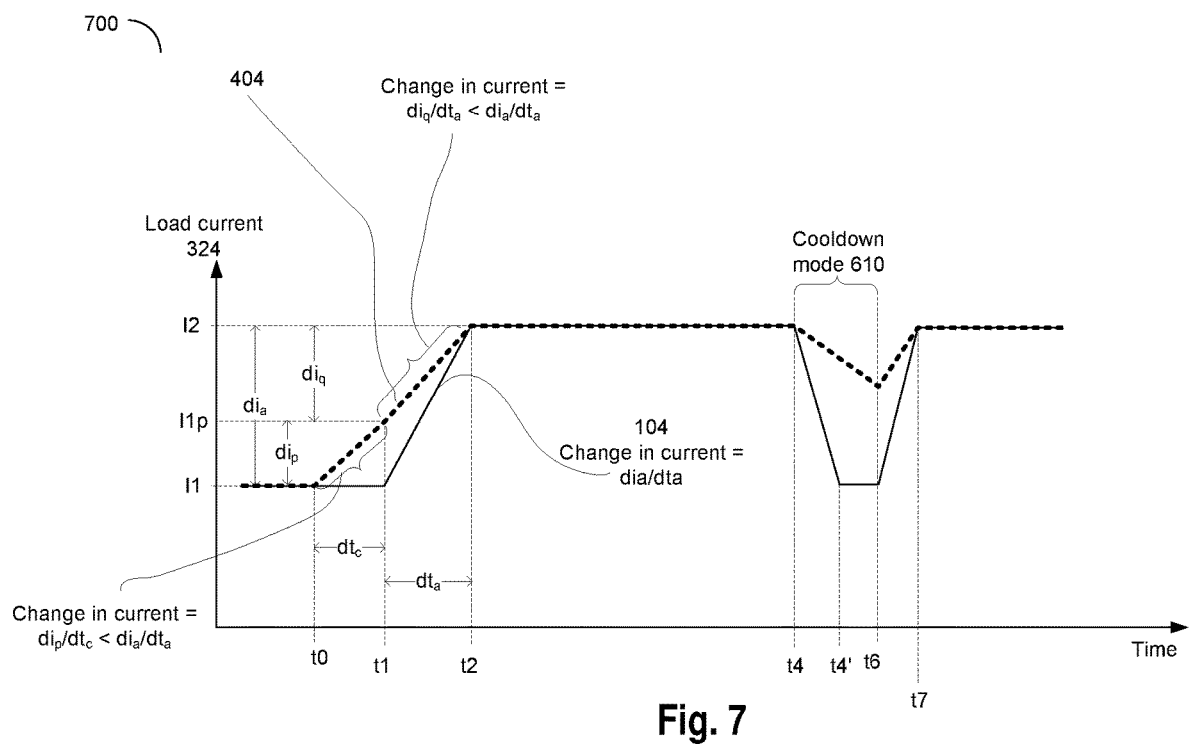
FIG. 7 illustrates a graph depicting a cooldown mode, according to some embodiments.

In some embodiments, the load 308 does not execute any dummy instructions 316 in the cooldown mode 610. However, in another embodiment, the load 308 may start executing dummy instructions upon entering the cooldown mode 610. FIG. 7 illustrates a graph 700 depicting the cooldown mode 610, according to some embodiments. The graph 700 may be at least in part similar to the graph 400 of FIG. 4. However, unlike the graph 400, in the graph 700, a spike in the load current 324 (e.g., between time t1 and t4) is followed by another stalled condition from time t4. Also, from time t6, the load 308 may come out of the stalled condition, and start executing the instructions 312.

In a conventional system depicted by the line 104, the load current would have reduced from I2 at time t4 to about I1 at time t4', and again would have increased from I1 at time t6 to I2 at time t7—this would have resulted in high rate of change of the load current 324 between time t4 to t4', and also between time t6 to t7. In some embodiments, to prevent such high rate of change of the load current 324, the system 300 may start injecting the dummy instructions 316 from time t4. Such injection of the dummy instructions 316 may be based on detecting presence of high power instructions in the pipeline, predicting that the load 308 may come out of the stall soon, predicting possibility of another imminent sudden spike in the load current 324, and/or the like. As a result, the load current 324 may gradually decrease (e.g., based on a gradual decrease in the dummy instructions 316).

At time t6, when the load 308 comes out of the stall condition, the controller 308 transitions from the cooldown mode 610 back to the hot mode 608, as illustrated by line 627 in FIG. 6 and as also illustrated in FIG. 7.

Although not illustrated in FIG. 7, the controller 380 may remain in the cooldown mode 610 for at least a second threshold period of time (e.g., illustrated using the line 628), e.g., as measured by the counter 382. Once the counter 382 reaches the second threshold and the controller 380 has not still yet transitioned to the hot mode 608, the controller 380 may transition to the normal mode 604 (illustrated by the line 630).

In some embodiments, during the warmup mode 606 and/or the cooldown mode 610, the system 300 may waste energy (e.g., whenever low power instructions or no instructions are being executed). On the other hand, operating in these modes may prevent high spikes (e.g., transient overshoots and/or undershoots) in the voltage 328. Thus, the principles of this disclosure, merely as an example, may be appropriate for systems for which performance may be considered more critical that energy efficiency. In an example, the impact on energy efficiency may depend on the characteristics of the instructions being detected as 'high power' and their usage in the system workloads. For example, clustered usage of high power instructions in time may tend to reduce wasted energy, whereas frequent but scattered use of high power instructions may tend to exacerbate the efficiency penalty.

Figure 8:
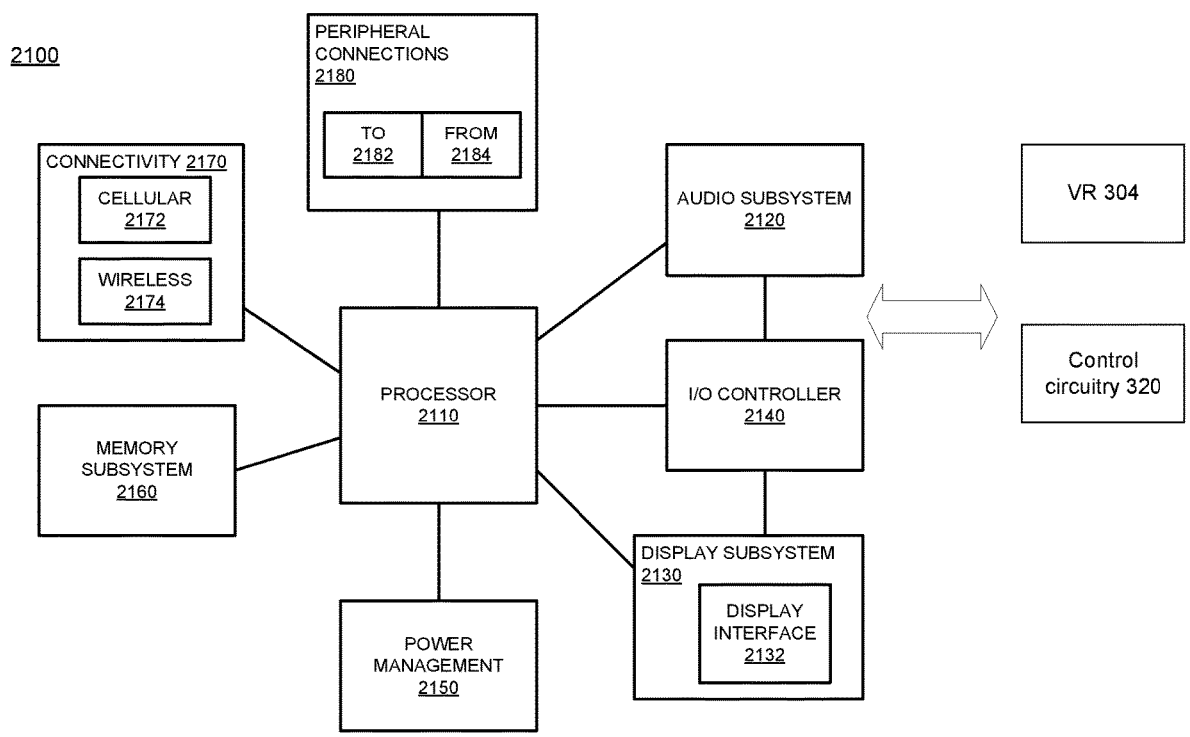
FIG. 8 illustrates a computer system, computing device or a SoC, wherein power noise (e.g., comprising dummy instructions) is opportunistically injected in a load ahead of a loading event to control a rate of change of a load current, according to some embodiments.

FIG. 8 illustrates a computer system, computing device or a SoC (System-on-Chip) 2100, wherein power noise (e.g., comprising dummy instructions 316) is opportunistically injected in a load ahead of a loading event to control a rate of change of a load current, according to some embodiments. It is pointed out that those elements of FIG. 8 having the same reference numbers (or names) as the elements of any other figure can operate or function in any manner similar to that described, but are not limited to such.

In some embodiments, computing device 2100 represents an appropriate computing device, such as a computing tablet, a server, a workstation, a mobile phone or smartphone, a laptop, a desktop, an IOT device, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the VR 304 supplying load current to a load (e.g., the load may any appropriate component of the computing device 2100, e.g., the processor 2110). In some embodiments, the control circuitry 320 may predict a loading event, and may control a rate of change in the load current by injecting dummy instructions 316 in the load, as discussed in details herein with respect to FIGS. 3A-7.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a component; a voltage generator to supply load current to the component; first one or more circuitries to predict that the load current is to increase from a first time; and second one or more circuitries to, in anticipation of the increase in the load current from the first time, cause the component to execute first instructions during a time period that occurs prior to the first time.

Example 2

The apparatus of example 1 or any other examples, wherein the time period occurs immediate prior to the first time.

Example 3

The apparatus of example 1 or any other examples, wherein the first instructions are to generate useless results from the component.

Example 4

The apparatus of any of examples 1-3 or any other examples, wherein the component is to execute second instructions from the first time.

Example 5

The apparatus of example 4 or any other examples, further comprising: a multiplexer to receive the first instructions and the second instructions, wherein the second one or more circuitries are to cause the multiplexer to output the first instructions during the time period, in anticipation of the increase in the load current from the first time.

Example 6

The apparatus of example 5 or any other examples, wherein the second one or more circuitries are to cause the multiplexer to output the second instructions subsequent to the first time.

Example 7

The apparatus of example 5 or any other examples, wherein the second one or more circuitries comprises: a controller to receive the prediction from the first one or more circuitries, and to generate an injection status signal; and a logical AND gate to receive the injection status signal and a load status signal, and to output a control signal, wherein the load status signal is to provide an indication of whether the component is executing as assigned workload, wherein the control signal is to control the multiplexer to selectively output one of the first instructions or the second instructions.

Example 8

The apparatus of any of examples 1-3 or any other examples, wherein: the component is to operate in a stall condition prior to the first time; and the component is to exit the stall condition from the first time.

Example 9

The apparatus of any of examples 1-3 or any other examples, wherein: the component is to enter in a stall condition at a second time that occurs subsequent to the first time; and the second one or more circuitries are to, in anticipation of the component exiting from the stall condition subsequent to the second time, cause the component to execute the first instructions during another time period that occurs subsequent to the second time.

Example 10

The apparatus of any of examples 1-3 or any other examples, wherein: the component comprises a plurality of arithmetic logical units (ALUs), wherein the second one or more circuitries are to cause one or more of the plurality of ALUs, but not all the ALUs, to execute the first instructions during the time period.

Example 11

A system comprising: a memory; a processing core coupled to the memory; a power source to supply load current to the processing core, wherein the processing core is to exit from a stall condition at a first time; and one or more circuitries to cause an increase in the load current prior to the first time, based on the exit of the processing core from the stall condition at the first time.

Example 12

The system of example 11 or any other examples, wherein the one or more circuitries are to cause the increase in the load current immediately prior to the first time.

Example 13

The system of example 11 or any other examples, wherein the one or more circuitries are to cause the increase in the load current by causing the processing core to execute first instructions prior to the first time.

Example 14

The system of example 11 or any other examples, wherein the first instructions are not associated with an intended workload of the processing core.

Example 15

The system of any of examples 11-14 or any other examples, further comprising: an instruction pipeline to store instructions that the processing core is to execute; and another one or more circuitries to monitor for presence of one or more high power instructions in the instruction pipeline, and to predict that the processing core is to potentially and imminently exit from the stall condition current.

Example 16

The system of example 15 or any other examples, wherein: while the processing core is to enter another stall condition and while the instruction pipeline stores another one or more high power instructions, the one or more circuitries are to cause the processing core to execute dummy instructions upon the processing core entering the another stall condition.

Example 17

A non-transitory computer-readable storage media to store instructions that, when executed by a processor, cause the processor to perform operations comprising: determine that an instruction pipeline comprises a plurality of instructions to be executed by a component; predict a first time at which the component is to start executing the plurality of instructions; and facilitate, immediate prior to the first time, an increase in a load current supplied by a voltage regulator to the component.

Example 18

The non-transitory computer-readable storage media of example 17 or any other examples, wherein the plurality of instructions included in the pipeline is a first plurality of instructions, and wherein to facilitate the increase in the load current, the instructions cause the processor to perform operations comprising: facilitate the component to execute a second plurality of instructions that are not included in the instruction pipeline.

Example 19

The non-transitory computer-readable storage media of example 18 or any other examples, wherein the second plurality of instructions are dummy instructions that are to generate useless results from the component.

Example 20

The non-transitory computer-readable storage media of example 18 or any other examples, wherein the instructions, when executed, further cause the processor to: refrain from facilitating the component to execute the second plurality of instructions, once the component starts executing the first plurality of instructions.

Example 21

The non-transitory computer-readable storage media of any of examples 17-19 or any other examples, wherein to facilitate the increase in the load current, the instructions cause the processor to perform operations comprising: inject power noise to the component.

Example 22

A method comprising: determining that an instruction pipeline comprises a plurality of instructions to be executed by a component; predicting a first time at which the component is to start executing the plurality of instructions; and facilitating, immediate prior to the first time, an increase in a load current supplied by a voltage regulator to the component.

Example 23

The method of example 22 or any other examples, wherein the plurality of instructions included in the pipeline is a first plurality of instructions, and wherein facilitating the increase in the load current supplied by the voltage regulator to the component comprises: facilitating the component to execute a second plurality of instructions that are not included in the instruction pipeline.

Example 24

The method of example 23 or any other examples, wherein the second plurality of instructions are dummy instructions that are to generate useless results from the component.

Example 25

The method of example 23 or any other examples, further comprising: refraining from facilitating the component to execute the second plurality of instructions, once the component starts executing the first plurality of instructions.

Example 26

The method of any of examples 22-25 or any other examples, wherein facilitating the increase in the load current comprises: injecting power noise to the component.

Example 27

One or more non-transitory computer-readable storage media to store instructions that, when executed by a processor, cause the processor to execute a method of any of the examples 22-26 or any other examples.

Example 28

An apparatus comprising: means for performing the method of any of the examples 22-26 or any other examples.

Example 29

An apparatus comprising: means for determining that an instruction pipeline comprises a plurality of instructions to be executed by a component; means for predicting a first time at which the component is to start executing the plurality of instructions; and means for facilitating, immediate prior to the first time, an increase in a load current supplied by a voltage regulator to the component.

Example 30

The apparatus of example 29 or any other examples, wherein the plurality of instructions included in the pipeline is a first plurality of instructions, and wherein the means for facilitating the increase in the load current supplied by the voltage regulator to the component comprises: means for facilitating the component to execute a second plurality of instructions that are not included in the instruction pipeline.

Example 31

The apparatus of example 30 or any other examples, wherein the second plurality of instructions are dummy instructions that are to generate useless results from the component.

Example 32

The apparatus of example 30 or any other examples, further comprising: means for refraining from facilitating the component to execute the second plurality of instructions, once the component starts executing the first plurality of instructions.

Example 33

The apparatus of any of examples 29-32 or any other examples, wherein the means for facilitating the increase in the load current comprises: means for injecting power noise to the component.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a component;
a voltage generator to supply load current to the component;
first one or more circuitries to predict that the load current is to increase from a first time, wherein the first one or more circuitries is to predict the increase in load current by a determination that a stall condition of the component is to end near the first time, and wherein the stall condition is caused by latency in data fetch from a memory; and
second one or more circuitries to, in anticipation of the increase in the load current from the first time and an end of the stall condition, cause the component to execute first instructions during a time period that occurs prior to the first time, wherein the first instructions draw a relatively larger amount of current from the voltage generator compared to current drawn after the first time.

2. The apparatus of claim 1, wherein the time period occurs immediate prior to the first time.

3. The apparatus of claim 1, wherein the first instructions are to generate useless results from the component.

4. The apparatus of claim 1, wherein the component is to execute second instructions from the first time.

5. The apparatus of claim 4, further comprising:
a multiplexer to receive the first instructions and the second instructions,
wherein the second one or more circuitries are to cause the multiplexer to output the first instructions during the time period, in anticipation of the increase in the load current from the first time.

6. The apparatus of claim 5, wherein the second one or more circuitries are to cause the multiplexer to output the second instructions subsequent to the first time.

7. The apparatus of claim 5, wherein the second one or more circuitries comprises:
a controller to receive the prediction from the first one or more circuitries, and to generate an injection status signal; and
a logical AND gate to receive the injection status signal and a load status signal, and to output a control signal, wherein the load status signal is to provide an indication of whether the component is executing as assigned workload, and
wherein the control signal is to control the multiplexer to selectively output one of the first instructions or the second instructions.

8. The apparatus of claim 1, wherein:
the component is to exit the stall condition from the first time.

9. The apparatus of claim 1, wherein:
the component is to enter in the stall condition at a second time that occurs subsequent to the first time; and
the second one or more circuitries are to, in anticipation of the component exiting from the stall condition subsequent to the second time, cause the component to execute the first instructions during another time period that occurs subsequent to the second time.

10. The apparatus of claim 1, wherein:
the component comprises a plurality of arithmetic logical units (ALUs),
wherein the second one or more circuitries are to cause one or more of the plurality of ALUs, but not all the ALUs, to execute the first instructions during the time period.

11. A system comprising:
a memory;
a processor core coupled to the memory;
a power source to supply load current to the processor core, wherein the processor core is to exit from a stall condition at a first time;
a first one or more circuitries to cause an increase in the load current prior to the first time, based on the exit of the processor core from the stall condition at the first time;
a second one or more circuitries to predict the increase in the load current by a determination that the stall condition of the processor core is to end near the first time, wherein the stall condition is caused by latency in data fetch from the memory, wherein the increase in the load current reduces slope of the load current from a time point prior to the first time to a time point after the first time, and wherein increase in the load current is higher compared to increase in current upon exist of the stall condition.

12. The system of claim 11, wherein the one or more circuitries are to cause the increase in the load current immediately prior to the first time.

13. The system of claim 11, wherein the processor core is to execute first instructions prior to the first time to cause the increase in the load current.

14. The system of claim 13, wherein the first instructions are not associated with an intended workload of the processor core.

15. The system of claim 11, further comprising:
an instruction pipeline to store instructions that the processor core is to execute; and
wherein the second one or more circuitries is to monitor for presence of one or more high power instructions in the instruction pipeline, and to predict that the processor core is to potentially and imminently exit from the stall condition current.

16. The system of claim 15, wherein:
while the processor core is to enter another stall condition and while the instruction pipeline stores another one or more high power instructions, the first one or more circuitries are to cause the processor core to execute dummy instructions when the processor core enters the another stall condition.

17. A non-transitory computer-readable storage media to store instructions that, when executed by a processor, cause the processor to perform operations comprising:
determine that an instruction pipeline comprises a plurality of instructions to be executed by a component;
predict a first time at which the component is to start executing the plurality of instructions;
predict an increase in a load current by determination that a stall condition of the component is to end ear the first time, wherein the stall condition is caused by latency in data fetch from a memory; and
facilitate, immediate prior to the first time, the increase in the load current supplied by a voltage regulator to the component, wherein the increase in the load current is higher than current drawn at the first time.

18. The non-transitory computer-readable storage media of claim 17, wherein the plurality of instructions included in the pipeline is a first plurality of instructions, and wherein to facilitate the increase in the load current, the instructions cause the processor to perform operations comprising:
facilitate the component to execute a second plurality of instructions that are not included in the instruction pipeline.

19. The non-transitory computer-readable storage media of claim 18, wherein the instructions, when executed, further cause the processor to:
refrain from facilitating the component to execute the second plurality of instructions, once the component starts executing the first plurality of instructions.

20. The non-transitory computer-readable storage media of claim 17, wherein to facilitate the increase in the load current, the instructions cause the processor to perform operations comprising:
inject power noise to the component.

* * * * *